NOISE ELIMINATION IN A RECORDER-REPRODUCER SYSTEM

Filed Feb. 28, 1955 3 Sheets-Sheet 1

INVENTOR.
J. GUY WOODWARD
BY Morris L. Rabkin
ATTORNEY

INVENTOR.
J. GUY WOODWARD
BY Morris A. Rabkin
ATTORNEY

Oct. 25, 1960 J. G. WOODWARD 2,957,953

NOISE ELIMINATION IN A RECORDER-REPRODUCER SYSTEM

Filed Feb. 28, 1955 3 Sheets-Sheet 3

INVENTOR.
J. GUY WOODWARD
BY Morris L. Rabkin
ATTORNEY

United States Patent Office 2,957,953

Patented Oct. 25, 1960

2,957,953

NOISE ELIMINATION IN A RECORDER-REPRODUCER SYSTEM

J. Guy Woodward, Princeton, N.J., assignor to Radio Corporation of America, a corporation of Delaware Filed Feb. 28, 1955, Ser. No. 490,924

4 Claims. (Cl. 179—100.2)

This invention relates to signal-translating systems, and more particularly to means providing for the reduction or cancellation of noises introduced into the signal through operation of a signal-translating means.

In a signal-translating system such, for example, as a magnetic-recording system, spurious noises are introduced into and superimposed upon an intelligence signal through the operation of the system. In the case of the illustrative example, that is a magnetic-recording system, such noises may be occasioned by irregularities in the surface of the magnetic record tape or through irregularities in the contact pressure between the magnetic record tape and the magnetic record transducer either during recording or reproduction, or both. Although, in conventional audio applications of magnetic recording, these spurious noises are frequently innocuous, when magnetic record tape is driven at relatively high speeds, as in magnetic recording video systems, these spurious noises are found to be bothersome.

Accordingly, it is an object of this invention to provide a signal-translating system wherein the effects of such noises are substantially neutralized.

It is another object of this invention to provide a magnetic-recording system of the type suitable for use in carrying the audio portion of a television recording system wherein spurious noises introduced by the recording system are substantially cancelled.

In accomplishing these and other objects, there has been provided a signal translating system wherein two carrier signals are modulated by an intelligence signal. The intelligence signal used to modulate one of the carriers is a phase inversion of the signal used to modulate the other of the carriers. The two modulated carriers are superimposed and recorded on a record member. The recorded signals are retranslated and separated into two channels corresponding to the two carrier frequencies. The signals are separately demodulated. One of the demodulated signals is inverted and is superimposed upon the other demodulated signal. This superimposition causes the intelligence signals to be added in phase. However, due to the inversion, the noise components of the signals are added out of phase and accordingly tend to cancel each other.

A better understanding of this invention may be had from the following detailed description when read in connection with the accompanying drawing; in which, Fig. 1 is a schematic block diagram representing the recording phase of the system;

Figure 1:
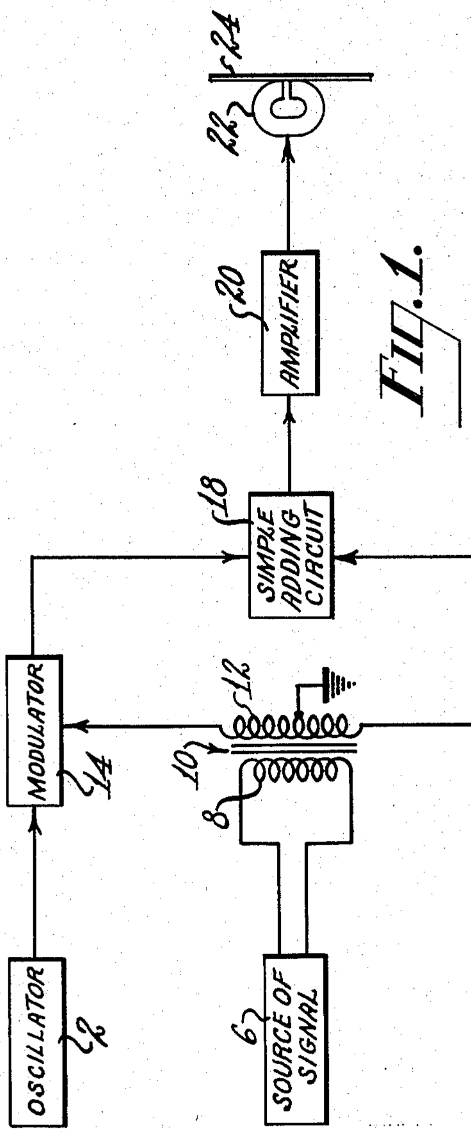

Referring now to the drawing in more detail, there is shown an oscillator 2 which is operated to provide a first carrier signal of a predetermined frequency. A second oscillator 4 is similarly operated to provide a second carrier signal of a frequency which is preferably different from the frequency of the first carrier signal. A source of intelligence signals 6 is connected to the primary 8 of an input transformer 10. The source of intelligence signals may comprise a microphone, in which case, the intelligence signals will be in the nature of audio signals. The secondary 12 of the transformer 10 is center tapped and grounded at the center tap. One terminal end of the secondary is connected to a modulator 14 which is also connected to the oscillator 2. In the modulator 14, the first carrier signal is modulated by the intelligence signal. This produces a first modulated carrier.

The opposite terminal end of the secondary 12 of the transformer 10 is connected to a second modulator 16. The second oscillator 4 is also connected to the modulator 16 whereby the second carrier signal is modulated by the intelligence signal as supplied from the lower terminal of the secondary 12 of the transformer 10. It will be appreciated that since the secondary 12 is grounded at the center, the intelligence signal applied to the modulator 16 is identical with the signal applied to the modulator 14 with the exception that it is phase inverted with respect to the signal applied to the modulator 14.

Thus we have two carriers modulated by the same intelligence signal. These two carriers are added or superimposed one upon the other in a simple adding circuit 18. The mixed or combined signal is fed from the adding circuit to an amplifier 20 and, thence, to a signal translating device, such, for example, as a magnetic recording head 22. The superimposed or mixed signal is impressed upon a record receiving member such, for example, as a magnetic record tape 24.

Figure 2:
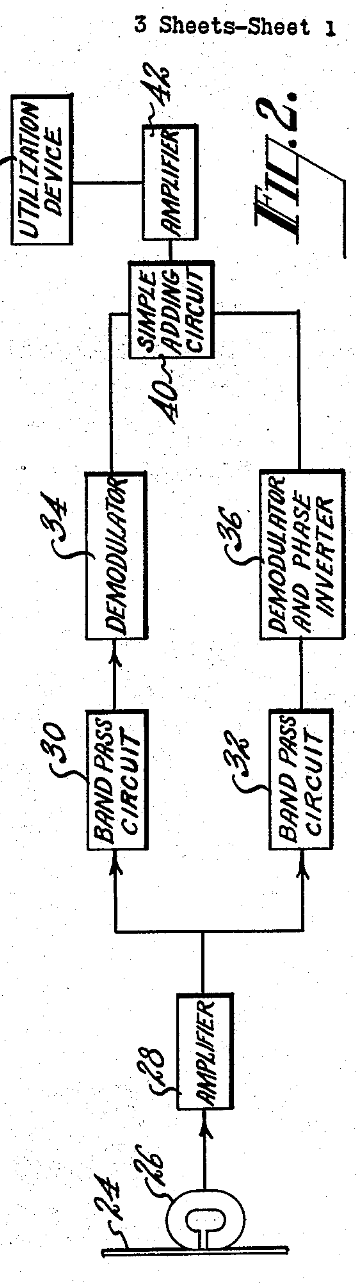
Fig. 2 is a schematic block diagram representing the reproducing phase of the system.

Referring now to Fig. 2, the record receiving member 24 is engaged by a signal detecting or retranslating means such as a magnetic playback head 26. The signal detected or translated by the playback head 26 is, of course, the superimposed or mixed modulated signals. This signal is amplified by an amplifier 28 and passed through a pair of band-pass circuits 30 and 32. This separates the two signals which were combined in the adding circuit 18. The output of the band-pass circuit 30 corresponds to the modulated carrier signal which was the output of the modulator 14. This output is fed to a demodulator 34 the output of which corresponds to the portion of the intelligence signal which was supplied from the upper terminal of the secondary 12 of the transformer 10.

The output of the band-pass circuit 32 corresponds to the output of the modulator 16 and is fed to a demodulator 36. The output of the demodulator 36 corresponds to the intelligence signal which was supplied from the lower terminal of the secondary 12 of the transformer 10 to the modulator 16. The demodulator 36 is arranged to effect a phase inversion of the signal applied thereto. The phase-inverted output of the demodulator 36 includes an intelligence signal which is now in phase with the intelligence-signal component of the output of the demodulator 34. These two signals, the output from the demodulator 34 and the output of the demodulator 36, are combined in a simple adding circuit 40. The combined signals are amplified in an amplifier 42 and fed to a utilization device 44. In the event of the intelligence signal being an audio signal, the utilization device 44 may well be a loudspeaker or system of loudspeakers.

During the recording phase of the system or operation, the intelligence signal was applied to the two modulators 14 and 16 in phase oppositon relation with respect to each other. During the course of the translation of the signals, including the recording and reproducing thereof, noise components will be introduced into and superimposed upon the intelligence signal. Under ordinary conditions of recording and reproduction, these noise components would be reproduced along with the intelligence signal. In the system according to the present invention, the same noise components will be superimposed upon both of the modulated carrier signals. When the two carriers are separated, the intelligence signals will be still in phase-opposition relation while the noise components of each of the two channels bear an in-phase relationship with respect to each other. However, when the signal applied to one of the demodulators is inverted thereby, the intelligence components of the signal will bear an in-phase relationship with respect to each other while the noise components appear in a phase-opposition relationship with respect to each other. In this condition, the combining of the two trains of signals results in a doubling of the amplitude of the intelligence components of the signal while the noise components tend to neutralize or cancel each other. Such a recording or signal translating system results in a considerable improvement in the signal-to-noise ratio.

Figure 3:
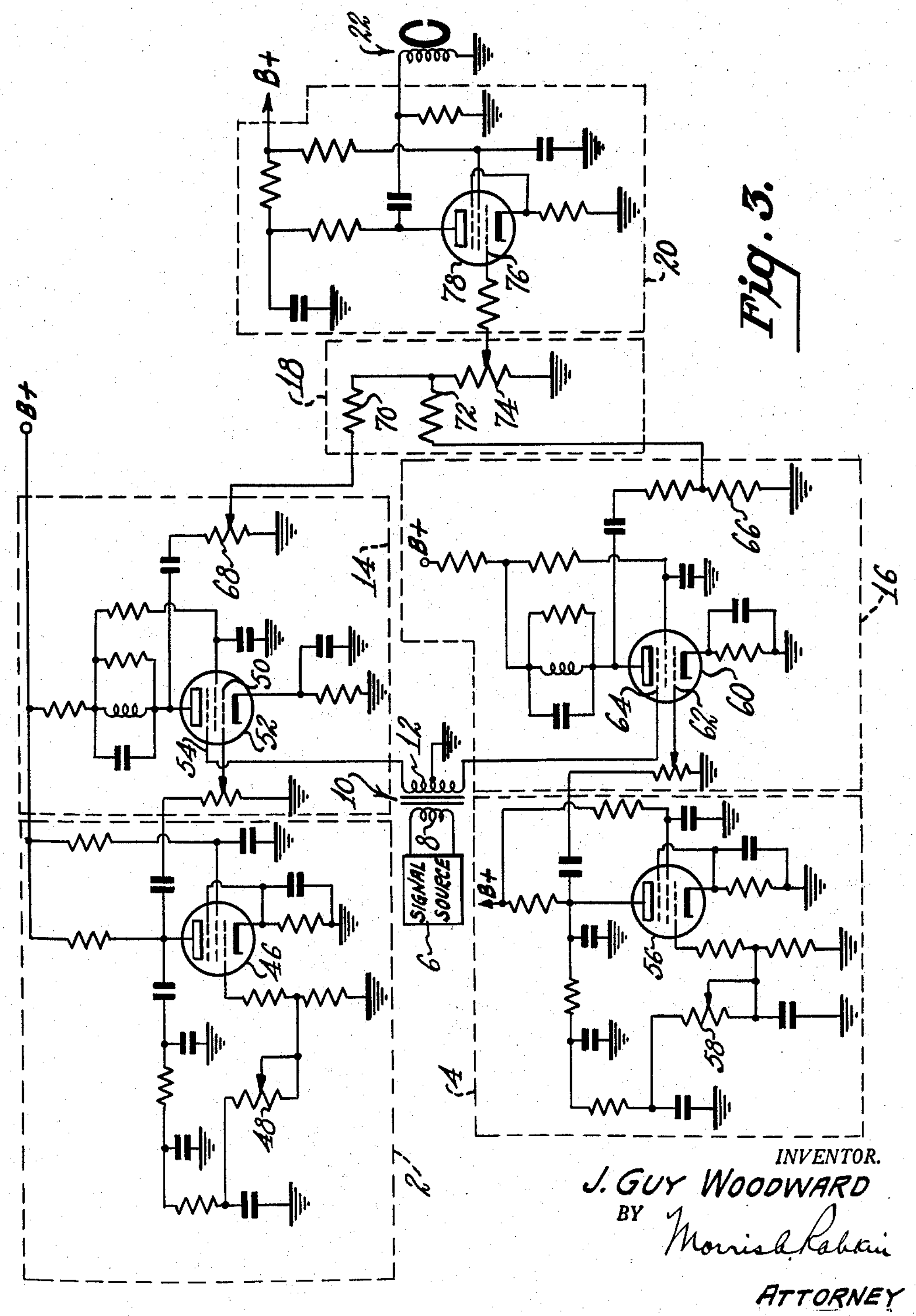
Fig. 3 is a schematic circuit diagram illustrating an embodiment of that portion of the invention shown in Fig. 1.

The circuit components used in one embodiment of apparatus constructed in accordance with the present invention are schematically shown in the circuit diagram of Fig. 3 and are representative of the circuit components which may be substituted in the several blocks of block diagram shown in Fig. 1.

With reference now to Fig. 3, the source of signal 6 is again coupled to an input transformer 10. The secondary 12 of the transformer 10 is center tapped and grounded at the center tap. The oscillator 2 includes a vacuum tube 46 coupled in a circuit to provide an RC oscillator whose frequency may be adjusted over a limited range through adjustments of a potentiometer 48 connected in its grid circuit. This oscillator 2 is tuned and adjusted to provide a carrier frequency of about 137 kilocycles per second. The output of the oscillator 2 is fed to the control grid 50 of the modulator tube 52. One terminal of the secondary 12 of the transformer 10 is connected to the suppressor grid 54 of the modulator tube 52. Thus the signal applied to the transformer from the signal source 6 is used to modulate the first carrier signal.

Similarly, the oscillator 4 includes a vacuum tube 56 which is also coupled in a circuit to constitute an RC oscillator. This oscillator is tuned and adjusted, through a potentiometer 58 in its grid circuit, to oscillate at a frequency of approximately 87 kilocycles per second. The output of this oscillator is fed to modulator 16. The modulator 16 includes a modulator tube 60 whose control grid 62 is coupled to the oscillator 4. The suppressor grid 64 of the modulator tube 60 is supplied with signals from the secondary of the input transformer. These signals are a phase inversion of the signals applied to the suppressor grid of the modulator tube 52 in the modulator 14.

The output of the modulator tube 60 is fed through a voltage divider 66 to the aiding circuit 18. The output of the modulator 14 is fed through a variable voltage divider 68 to the adding circuit 18. The variable voltage divider 68 permits the output of the modulator 14 to be balanced with respect to the output of the modulator 16. The adding circuit includes a first resistor 70 in the output circuit of the modulator 14 and a substantially identical resistor 72 in the output circuit of the modulator 16. The two resistors are connected in parallel with respect to each other and both in series with a third resistor 74 which is connected at its opposite end to ground.

The third resistor 74 is a potentiometer, the adjustable tap of which is connected to the input circuit or control grid 76 of an amplifier tube 78. This amplifier tube 76 together with its accompanying circuitry corresponds to the amplifier 20 of Fig. 1. The output of this amplifier is fed to a recording transducer 22.

Figure 4:
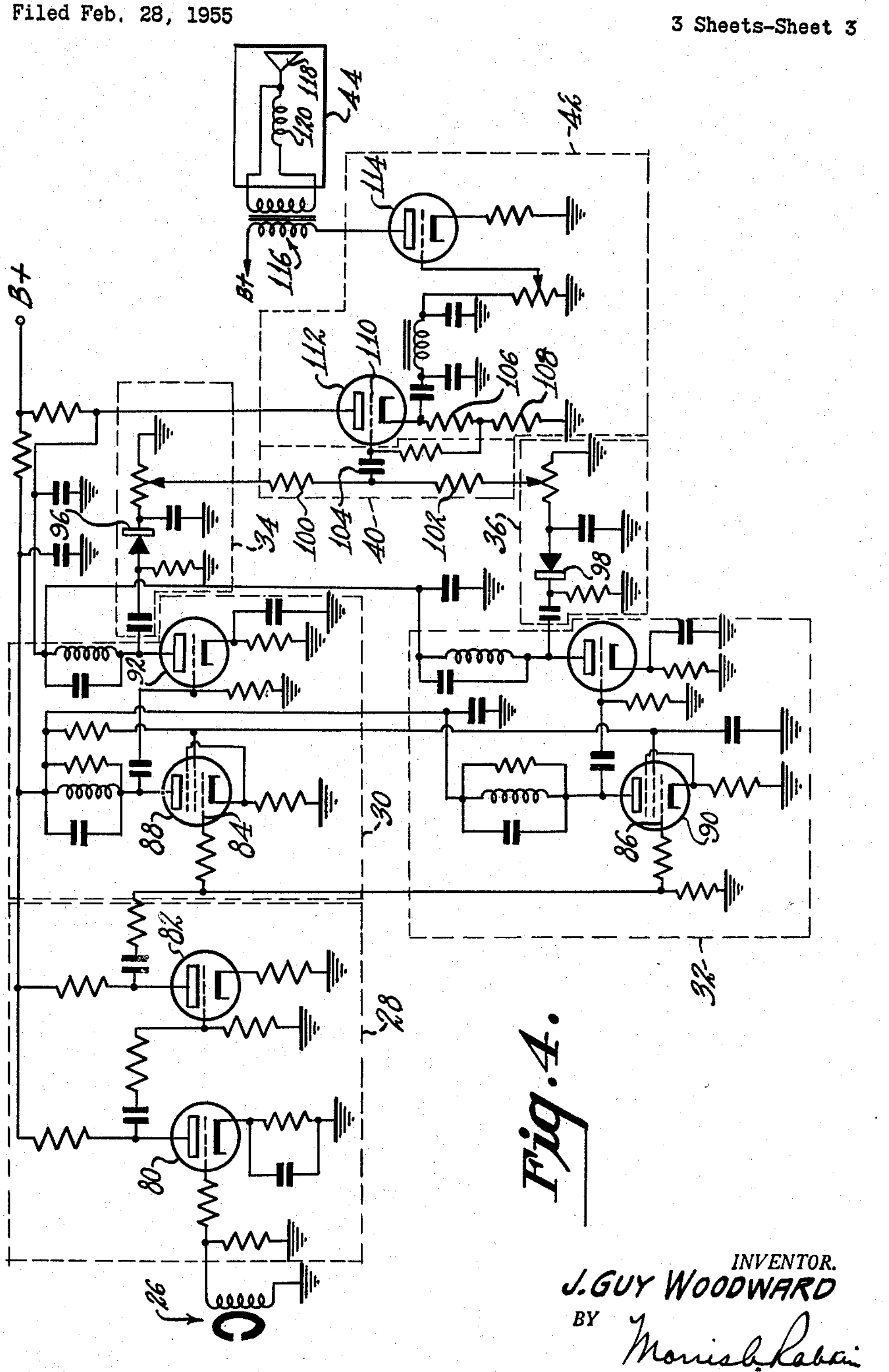
Fig. 4 is a schematic circuit diagram illustrating an embodiment of that portion of the invention shown in Fig. 2.

Fig. 4 is a schematic circuit diagram which is illustrative of circuit components which may be substituted into the block of the block diagram of Fig. 2. Referring now to Fig. 4, a playback head 26 is coupled into an amplifier 28. The amplifier 28 includes a two-stage amplifier comprising vacuum tubes 80 and 82. The output of the amplifier is fed to the input grids 84 and 86 respectively of each of the two tubes 88 and 90. The tube 88 together with its associated circuitry and the tube 92 with its associated circuitry constitutes a first band-pass amplifier 30. This circuit is tuned to pass the modulated carrier corresponding to the output of the first modulator 14. Similarly, the tube 90 with its associated circuitry and the tube 94 with its associated circuitry constitutes a band-pass amplifier 32. This band-pass circuit is tuned to pass signals corresponding to the second modulated carrier.

The output of the first band-pass circuit 30 is applied to the demodulator 34. In this instance, the demodulator comprises a diode detector 96. Similarly, the output of the band-pass circuit 32 is applied to a demodulator 36. This demodulator is also shown as including a diode detector 98. As previously indicated, one of the signal channels is provided with means for inversion of the signal and, also as indicated, this inversion may be accomplished through the operation of the demodulator. Such an arrangement is shown in the illustrative embodiment of Fig. 4. From an observation of the two diode detectors, it will be seen that one of them is arranged to pass only the positive signal components while the other is arranged to pass only the negative signal components. This arrangement accomplishes, simultaneously with the demodulation, the inversion of one of the signals relative to the other.

The output from the demodulator 34 is fed to an adding circuit 40 as is the output from the demodulator 36. The adding circuit comprises a first resistor 100, connected in the output circuit of the demodulator 34, and a second resistor 102 coupled in the output circuit of the demodulator 36. These two resistors are joined at a common junction and connected through a coupling capacitor 104 and bias resistors 106 and 108 to ground. The coupling capacitor couples the added signals to the input or control grid 110 of a first amplifier tube 112 in the output amplifier 42. This first tube 112 is coupled through a suitable filter network to a second stage or power amplifier tube 114. The output of this amplifier is fed to the primary of an output transformer 116. The secondary of the transformer is coupled to a utilization device 44 which may comprise, as illustrated, a loudspeaker 118 the voice coil 120 of which is suitably connected in circuit with the secondary of the transformer 116.

While the invention has been described as related and applied to the field of magnetic recording, the invention is applicable to other types of signal translating systems. For example, instead of the mixed modulated signals being applied to a magnetic recording head, the translating devices may comprise a broadcast transmitter. In this case, the retranslating or detecting means will comprise radio signal receiving apparatus instead of a playback head 26.

What is claimed is:

1. A signal translating system comprising means for producing a first carrier signal, means for producing a second carrier signal of a frequency different from the frequency of said first carrier signal, a source of intelligence signals, means for modulating said first carrier signal with said intelligence signals, means for modulating said second carrier signal with intelligence signals in phase opposition to said intelligence signals used to modulate said first carrier signal, means for mixing said modulated signals, signal recording means for recording said mixed signals, signal pickup means for reproducing said recorded signals, means for separating the two modulated carrier signals, means for separately demodulating said signals, means for phase inverting one of said demodulated signals, and means for combining said demodulated signals to reconstruct the original intelligence signals.

2. A signal translating system comprising means for producing a first carrier signal, means for producing a second carrier signal of a frequency different from the frequency of said first carrier signals, a source of intelligence signals, means for modulating said first carrier signal with said intelligence signals, means for modulating said second carrier signal with intelligence signals in phase opposition to said intelligence signals used to modulate said first carrier signal, means for mixing said modulated signals, signal recording means for magnetically recording said mixed signals on a magnetic record member, magnetic pickup means for reproducing said recorded signals, means for separating the two modulated carrier signals, means for separately demodulating said signals, means for phase inverting one of said demodulated signals, and means for adding said demodulated signals to reconstruct the original intelligence signals.

3. A signal translating system comprising means for producing a first carrier signal, means for producing a second carrier signal of a frequency different from the frequency of said first carrier signal, a source of intelligence signals, means for modulating said first carrier signal with said intelligence signals, means for modulating said second carrier signal with intelligence signals in phase opposition to said intelligence signals used to modulate said first carrier signal, means for mixing said modulated signals, a magnetic record transducer, applying said mixed signals to said transducer whereby to record said mixed signals on a magnetic record member, magnetic record pickup means for reproducing said recorded signals, means for separating the two modulated carrier signals, means for separately demodulating said signals, means for phase inverting one of said demodulated signals, and means for adding said demodulated signals to reconstruct the original intelligence signals.

4. A signal translating system comprising means for producing a first carrier signal, means for producing a second carrier signal of a frequency different from the frequency of said first carrier signal, a source of intelligence signals, means for phase inverting said intelligence signals from said source, means for modulating said first carrier signal with said intelligence signals from said source, means for modulating said second carrier signal with said inverted intelligence signals, means for mixing said modulated signals, a magnetic record transducer, means for applying said mixed signals to said magnetic record transducer whereby to record said signals on a magnetic record member, a magnetic record pickup means for reproducing said recorded signals, means for separating said two modulated carrier signals, means for separately demodulating said signals, and means for adding said demodulated signals to reconstitute the original intelligence signals.

References Cited in the file of this patent

UNITED STATES PATENTS

| | | |
|---|---|---|
| 1,474,426 | Affel | Nov. 20, 1923 |
| 1,696,258 | Schmied | Dec. 25, 1928 |
| 1,745,415 | Green | Feb. 4, 1930 |
| 1,886,616 | Alverson | Nov. 8, 1932 |
| 2,227,415 | Wolff | Dec. 31, 1940 |
| 2,311,696 | Rubin | Feb. 23, 1943 |
| 2,394,544 | Gottier | Feb. 12, 1946 |
| 2,497,654 | Begun | Feb. 14, 1950 |
| 2,629,784 | Daniels | Feb. 24, 1953 |
| 2,697,755 | Friend | Dec. 21, 1954 |